(No Model.)
E. THOMSON.
DYNAMO ELECTRIC MACHINE.
No. 296,799.  Patented Apr. 15, 1884.
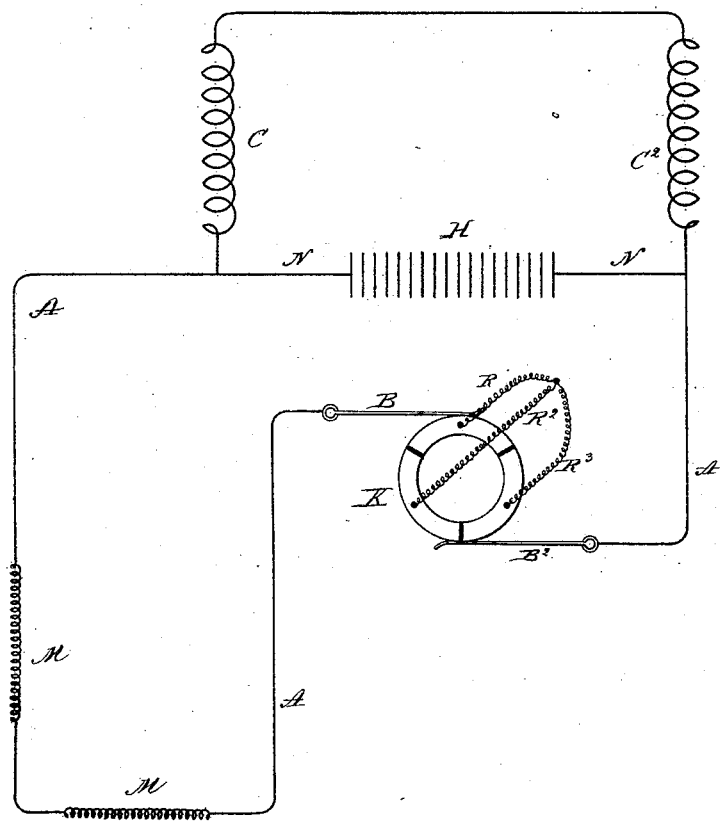
Witnesses:
Ernest Abshagen
Thos. Toomey
Inventor:
Elihu Thomson
By his Attorney:

UNITED STATES PATENT OFFICE.

ELIHU THOMSON, OF NEW BRITAIN, CONNECTICUT, ASSIGNOR TO THE THOMSON-HOUSTON ELECTRIC COMPANY, OF CONNECTICUT.

DYNAMO-ELECTRIC MACHINE.

SPECIFICATION forming part of Letters Patent No. 296,799, dated April 15, 1884.

Application filed December 18, 1883. (No model.)

*To all whom it may concern:*

Be it known that I, ELIHU THOMSON, a citizen of the United States, and a resident of New Britain, in the county of Hartford and State of Connecticut, have invented certain new and useful Improvements in Dynamo-Electric Machines, of which the following is a specification.

This application constitutes a division of a prior application for patent filed by me May 23, 1883, and is intended to cover the means therein described for preventing reversal of polarity of the field-magnet in a dynamo-electric machine.

My invention is intended more particularly for application to dynamo-electric machines used for electroplating or for charging secondary or storage batteries, and provides a means whereby reversal of the field-magnet by a return-current from the bath or battery is prevented when the speed of the machine decreases, or when from any other cause the current from the battery or bath is liable to discharge through the machine and reverse its polarity. My invention is not, however, limited to machines employed for charging secondary batteries or plating-baths, but is useful in connection with any dynamo-electric machine when, from the nature of the working-resistance or from the exposure of the line-wires to aerial or other currents of electricity from other sources, the polarity of the machine is liable to reversal by reason of a depolarizing or reversing current conducted to the field-magnets over the conductors connected to the commutator and the outside circuit.

My invention consists in the combination, with the field-magnet in a dynamo-electric machine, of a secondary or storage battery in a bridge around field-magnet coils, the current from which battery may discharge through said coils in the same direction as the current that normally charges the field-magnet, so as to preserve the polarity of the same.

The accompanying sheet of drawings illustrates the invention diagrammatically, and shows it as applied to a machine whose commutator is the three-segment commutator of the dynamo-electric machine covered by my prior patents.

K indicates a three-segment commutator, to which the armature-coils are connected in the manner described in my prior patents, and from which commutator the currents set up in the armature-coils are taken off by means of the commutator-brushes B B$^2$.

R R$^2$ R$^3$ indicate the armature-coils of a three-coil machine, said coils being connected together in a common joint at their ends opposite from the ends connected to the commutator. It is to be here understood that this form of machine is here described merely for purposes of illustration, and that the invention is to be applied to dynamo-electric machines of any armature construction or winding.

C C$^2$ indicate the coils of the field-magnet of the machine. Said magnets are energized in the usual and well-known manner by the current taken from the armature.

A indicates the circuit to which current is supplied from the machine, and which circuit contains one or more working-resistances, M M, which may be plating-baths, storage-batteries, electric lights, or other apparatus.

In a branch, N, around coils of the field-magnet is placed a storage-battery, H, which is charged by the current taken from a commutator-brush to supply the field-magnet, and will, as is obvious, when discharged, discharge its current through the field-magnet in the same direction as the current or portion of current normally charging said field-magnet, thus preserving or helping to preserve the polarity of the same. While the machine is in operation the secondary battery H will receive its charge; but if the machine stops or slows down, the discharge of the secondary battery H will oppose the effects of any counter-current from the plating-bath or other source that would, by circulating in the field-magnet coils, reverse the polarity of the magnets.

The secondary or storage battery H may obviously be of any desired kind.

What I claim as my invention is—

1. The combination, with the field-magnet in a dynamo-electric machine, of a secondary or storage battery in a branch around the field-magnet coils, and arranged in the manner described, so that the discharge-current from said battery may circulate through the coils in a direction to preserve the normal polarity of the magnet.

2. The combination, in a dynamo-electric machine, of field-magnet coils connected to a commutator-brush, a branch taken from a point between the commutator and said coils, and a secondary or storage battery in said branch, as and for the purpose described.

Signed at Boston, in the county of Suffolk and State of Massachusetts, this 13th day of December, A. D. 1883.

ELIHU THOMSON.

Witnesses:
JOSEPH J. SKINNER,
E. WILBUR RICE.